(12) United States Patent
Takahashi

(10) Patent No.: US 7,502,202 B2
(45) Date of Patent: Mar. 10, 2009

(54) HEAD SLIDER FOR MAGNETIC DISKS THAT PREVENTS ADHESION OF DUST

(75) Inventor: Shinichi Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 191 days.

(21) Appl. No.: 10/706,626

(22) Filed: Nov. 12, 2003

(65) Prior Publication Data

US 2004/0095680 A1      May 20, 2004

(30) Foreign Application Priority Data

Nov. 14, 2002    (JP) .............................. 2002-331039

(51) Int. Cl.
G11B 5/60         (2006.01)
(52) U.S. Cl. ................................. 360/236.3
(58) Field of Classification Search .............. 360/236.3, 360/235.8, 236.1, 235.5, 235.6, 235.7, 235.9, 360/236, 235.4
See application file for complete search history.

(56) References Cited

U.S. PATENT DOCUMENTS

| | | | | |
|---|---|---|---|---|
| 6,072,662 A | * | 6/2000 | Utsunomiya | ............. 360/236.1 |
| 6,801,399 B2 | * | 10/2004 | Nakano | .................... 360/236.3 |
| 6,950,281 B2 | | 9/2005 | Kameyama | |
| 7,149,056 B2 | | 12/2006 | Kameyama | |
| 7,251,105 B2 | | 7/2007 | Kameyama | |
| 2002/0075599 A1 | * | 6/2002 | Rao et al. | ................. 360/235.7 |
| 2002/0145828 A1 | * | 10/2002 | Mundt et al. | ............. 360/235.6 |
| 2003/0011934 A1 | * | 1/2003 | Kameyama | .............. 360/236.1 |

FOREIGN PATENT DOCUMENTS

| | | |
|---|---|---|
| JP | 04-117680 | 4/1992 |
| JP | 4-159671 | 6/1992 |
| JP | 7-41766 | 7/1995 |
| JP | 9-147340 | 6/1997 |
| JP | 10-255426 | 9/1998 |
| JP | 11016141 A * | 1/1999 |
| JP | 2001-266323 | 9/2001 |
| WO | WO 01-69601 | 9/2001 |

* cited by examiner

*Primary Examiner*—Mark Blouin
(74) *Attorney, Agent, or Firm*—Greer, Burns & Crain, Ltd.

(57) ABSTRACT

A head slider for magnetic disks is lifted above a magnetic disk by airflow generated by rotation of the magnetic disk. The head slider includes an airflow guide part. The airflow guide part guides the airflow along a disk-facing surface of the head slider toward the sides of the disk-facing surface.

22 Claims, 10 Drawing Sheets

FIG.5A
FIG.5B
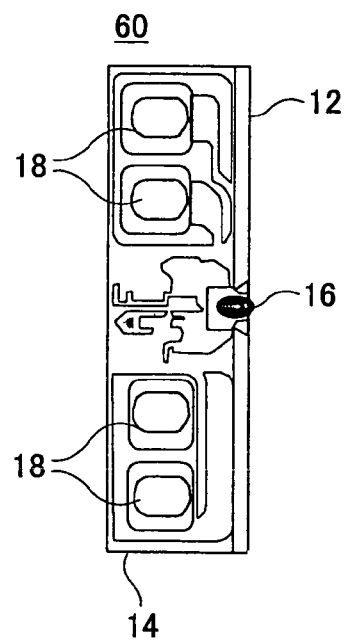
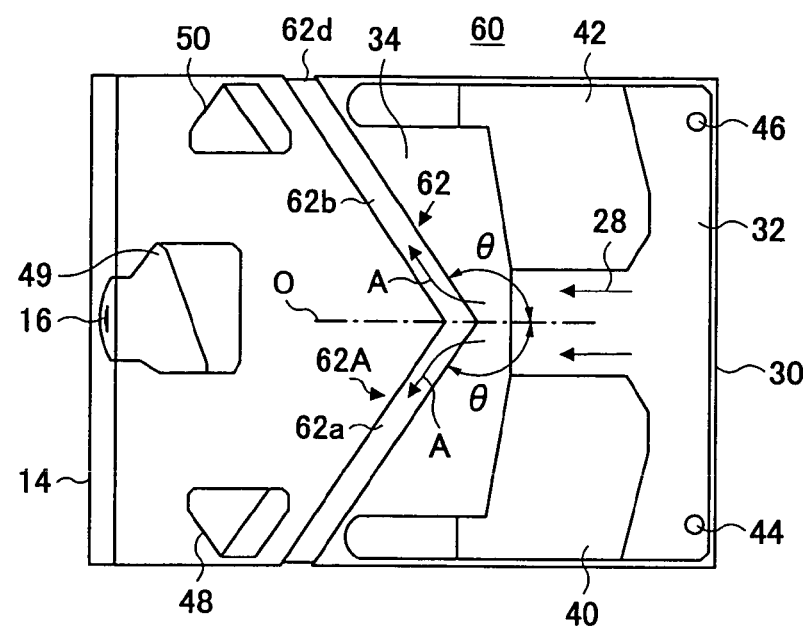
FIG.5C
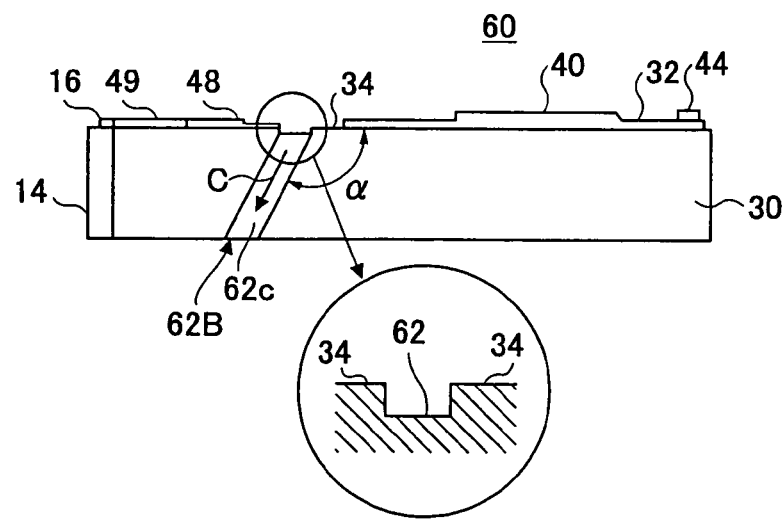

HEAD SLIDER FOR MAGNETIC DISKS THAT PREVENTS ADHESION OF DUST

BACKGROUND OF THE INVENTION

1. Field of the Invention

The present invention generally relates to head sliders for magnetic disks, and more particularly, to a head slider for magnetic disks that prevents dust that comes off of a lubricant layer formed on a surface of a magnetic disk from adhering to an end of a magnetic head.

2. Description of the Related Art

A head slider for magnetic disks used in a hard disk apparatus holds a magnetic head such that the magnetic head can perform magnetic recording/reproducing while the magnetic head is aerodynamically lifted closely above a surface of a magnetic disk. The magnetic head is lifted by a lifting force (pressure) created by airflow on the surface of the magnetic disk. The airflow is generated by rotation of the magnetic disk.

A lubricant layer is formed on the surface of the magnetic disk by applying a lubricant thereon. The lubricant layer prevents the disk surface from being scratched by reducing friction that is caused when the head slider contacts the disk surface (surface of the magnetic disk).

When the head slider contacts the surface of the magnetic disk, minute dust particles may come off the lubricant layer (minute dust includes, for example, dust adhering to a surface of the lubricant layer and dust created by peeling off a part of the lubricant layer). The dust that comes off the lubricant layer is blown off by airflow generated by rotation of the magnetic disk. Hence, there is a possibility that the dust may adhere to a surface of the head slider as contamination.

In a conventional head slider for magnetic disks, for example, a front shallow ditch and a pair of front pads are provided on the inflow end of the slider. An outflow pad shallow ditch and a triangle outflow pad surface are provided in the middle of the outflow end of the slider. The outflow pad surface includes two sidewalls crossing at a top that is positioned at the leading edge of the outflow pad surface. The two side walls are each formed at an angle of 5-75 degrees with respect to the center line along the longitudinal direction of the slider (for example, refer to Japanese Laid-Open Patent Application No. 2001-266323).

In the head slider for magnetic disks configured as mentioned above, when the slider is lifted with respect to a magnetic disk, there is a possibility that minute dust or the like may adhere to the outflow pad surface of the slider.

The two sidewalls crossing at the top of the outflow pad surface are each formed at angles of 5-75 degrees with respect to the center line. Thus, dust entering the space between a disk-facing surface (a surface facing the magnetic disk) of the slider and the surface of the magnetic disk is discharged toward the downstream from an outflow-side end along the sidewalls of the outflow pad surface that is formed into a triangle-like shape.

However, in the head slider for magnetic disks configured as mentioned above, since the triangle outflow pad surface is provided in the middle of the outflow end of the slider, airflow is dispersed to pass along both sides of the outflow pad surface and passes through the outflow-side end.

Hence, on the surface of the magnetic disk, when minute dust comes off the lubricant layer, there is a possibility that the dust of the lubricant layer is moved by airflow along the disk-facing surface of the slider and adheres to the outflow-side end of the slider.

The head slider for magnetic disks is held at a slant so that the outflow-side end having the magnetic head approaches the magnetic disk at a minute distance. Hence, when viscous dust of the lubricant layer adheres, as contaminant, to the outflow-side end that approaches the magnetic disk, a problem occurs in that the contaminant causes the outflow-side end to stick to the magnetic disk.

SUMMARY OF THE INVENTION

It is a general object of the present invention to provide an improved and useful head slider for magnetic disks in which one or more of the above-mentioned problems are eliminated.

It is another and more specific object of the present invention to provide a head slider for magnetic disks that prevents dust of a lubricant layer from adhering to an outflow-side end of the slider by guiding to both sides of the slider the dust entering the space between a disk-facing surface (a surface facing a magnetic disk) of the slider and a surface of the magnetic disk.

In order to achieve the above-mentioned objects, according to one aspect of the present invention, there is provided a head slider for magnetic disks lifted above a magnetic disk by airflow generated by rotation of the magnetic disk, the head slider including:

an airflow guide part that guides the airflow along a disk-facing surface of the head slider toward sides of the disk-facing surface.

According to the above-mentioned aspect of the present invention, dust entering the space between the disk-facing surface and the magnetic disk is discharged toward the sides of the slider by the airflow guided toward the sides of the disk-facing surface by the airflow guide part. Hence, it is possible to prevent dust from adhering to the outflow-side end of the slider.

In the head slider for magnetic disks according to the present invention, the airflow guide part may be formed to extend in directions each inclined at an angle with respect to the direction of the airflow.

Accordingly, it is possible to positively discharge dust entering the space between the disk-facing surface and the magnetic disk toward the sides of the slider.

In addition, the airflow guide part may include a capturing part that captures dust included in the airflow.

Accordingly, it is possible to prevent dust from adhering to the outflow-side end of the slider by capturing the dust that enters the space between the disk-facing surface and the magnetic disk by the capturing part of the airflow guide part.

Additionally, the airflow guide part may include:

a first guide part formed to extend from the vicinity of the center of the disk-facing surface to both sides of the disk-facing surface; and a pair of second guide parts formed on opposing side surfaces of the slider and continuing with the first guide part.

Accordingly, it is possible to prevent dust from adhering to the outflow-side end of the slider by discharging dust that enters the space between the disk-facing surface and the magnetic disk toward the sides of the slider and further discharging the dust toward the outflow side from the side surface of the slider.

Further, the first and second guide parts may be formed to extend in respective directions each inclined at an angle with respect to the direction of the airflow.

Accordingly, it is possible to positively discharge dust entering the space between the disk-facing surface and the magnetic disk toward the side of the slider and to further discharge the dust toward the outflow side from the side surface of the slider.

In addition, one of the first and second guide parts may include a capturing part that captures dust included in the airflow.

Accordingly, it is possible to prevent dust from adhering to the outflow-side end of the slider by capturing the dust entering the space between the disk-facing surface and the magnetic disk by the capturing part of one of the first and second guide parts.

Additionally, the airflow guide part may include:

a first guide groove formed to extend from the vicinity of the center of the disk-facing surface toward both sides of the disk-facing surface; and a second guide groove formed on a side surface of the head slider and communicating with the first guide groove.

Accordingly, it is possible to positively discharge dust entering the space between the disk-facing surface and the magnetic disk toward the sides of the slider and further discharge the dust toward the outflow side from the side of the slider by the first and second guide grooves.

Further, one of the first and second guide grooves may include a capturing groove that captures dust included in the airflow, and the capturing groove may be formed deeper than the first and second guide grooves.

Accordingly, it is possible to prevent dust entering the space between the disk-facing surface, facing a surface of a magnetic disk, and the magnetic disk from adhering to the outflow-side end of the slider by capturing the dust with the capturing groove of one of the first and second guide grooves.

In addition, in the first guide groove, an inflow-side wall along which the air flowing along the disk-facing surface enters the first guide groove may be an inclined surface, and an outflow-side wall along which the air flowing along the disk-facing surface is discharged may be a vertical surface.

Accordingly, since the inflow-side wall of the first guide groove is an inclined surface, the air flowing along the disk-facing surface can easily flow into the first guide groove. Hence, it is possible to positively discharge dust that is moved by the airflow toward the sides of the slider along the first guide groove.

Other objects, features and advantages of the present invention will become more apparent from the following detailed description when read in conjunction with the following drawings.

BRIEF DESCRIPTION OF THE DRAWINGS

FIG. 5A is a front elevational view, FIG. 5B is a bottom plan view, and FIG. 5C is a side elevational view showing the structure of the head slider for magnetic disks shown in FIG. 4;

DETAILED DESCRIPTION OF THE PREFERRED EMBODIMENTS

A description will now be given of a preferred embodiment of the present invention, with reference to the drawings.

Figure 1:
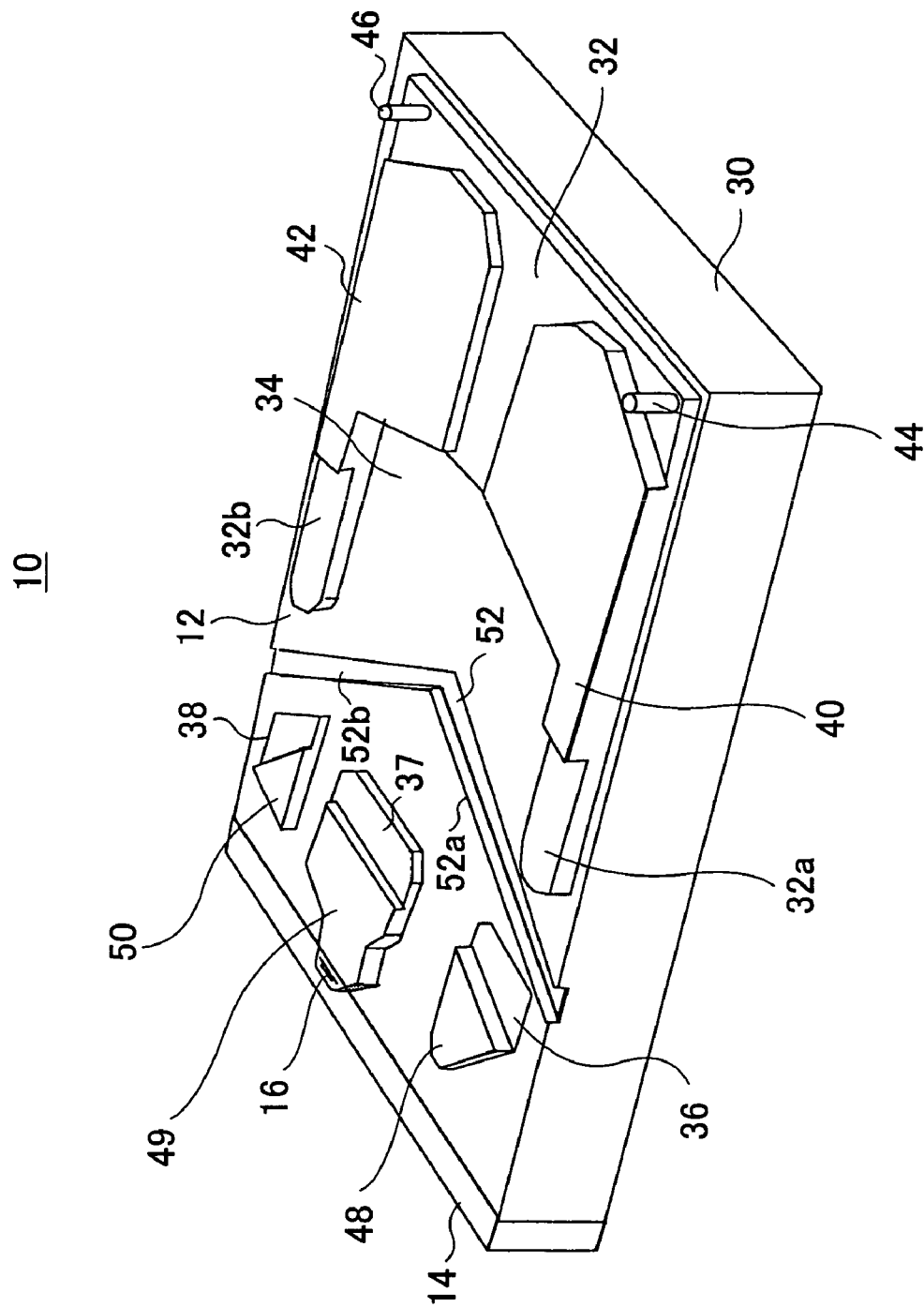
FIG. 1 is a perspective view showing a head slider for magnetic disks according to one embodiment of the present invention.
Figure 2A:
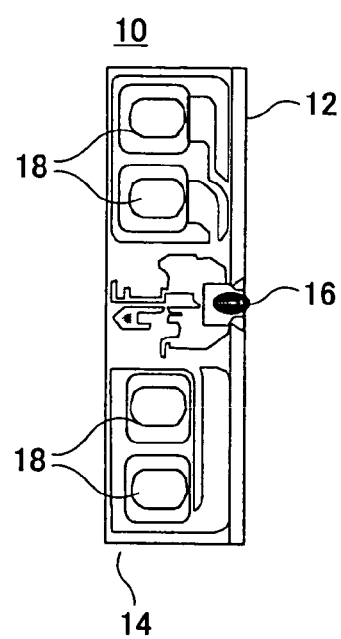
FIG. 2A is a front elevational view.
Figure 2B:
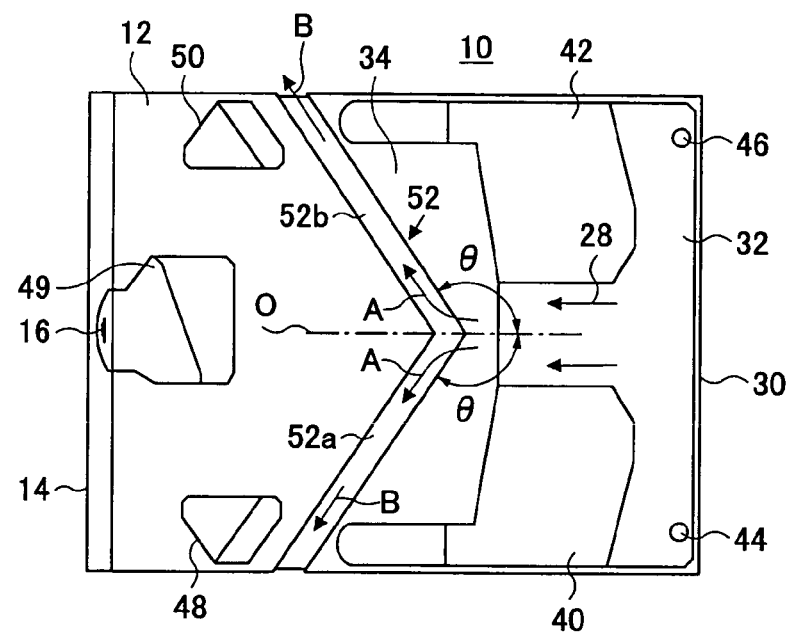
FIG. 2B is a bottom plan view.
Figure 2C:
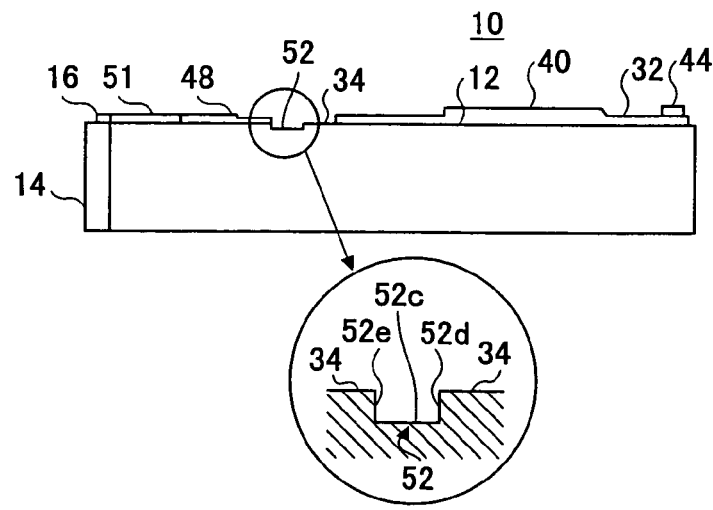
FIG. 2C is a side elevational view showing the structure of the head slider for magnetic disks shown in FIG. 1.

FIG. 1 is a perspective view of a head slider for magnetic disks according to one embodiment of the present invention. FIG. 2A is a front elevational view, FIG. 2B is a bottom plan view, and FIG. 2C is a side elevational view showing the structure of the head slider shown in FIG. 1.

A head slider for magnetic disks (hereinafter referred to as a "slider") 10 shown in FIG. 1 is formed by ceramics such as alumina, titanium, and carbide. Referring to FIGS. 1 and 2A through 2C, in the slider 10, a magnetic head 16 is mounted in the vicinity of an outflow-side end 14. Air flowing along a disk-facing surface 12, facing a magnetic disk, flows out from the outflow-side end 14. Connection pads 18 are formed on the outflow-side end 14. The connection pads 18 are electrically connected to respective terminals of the magnetic head 16.

Figure 3:
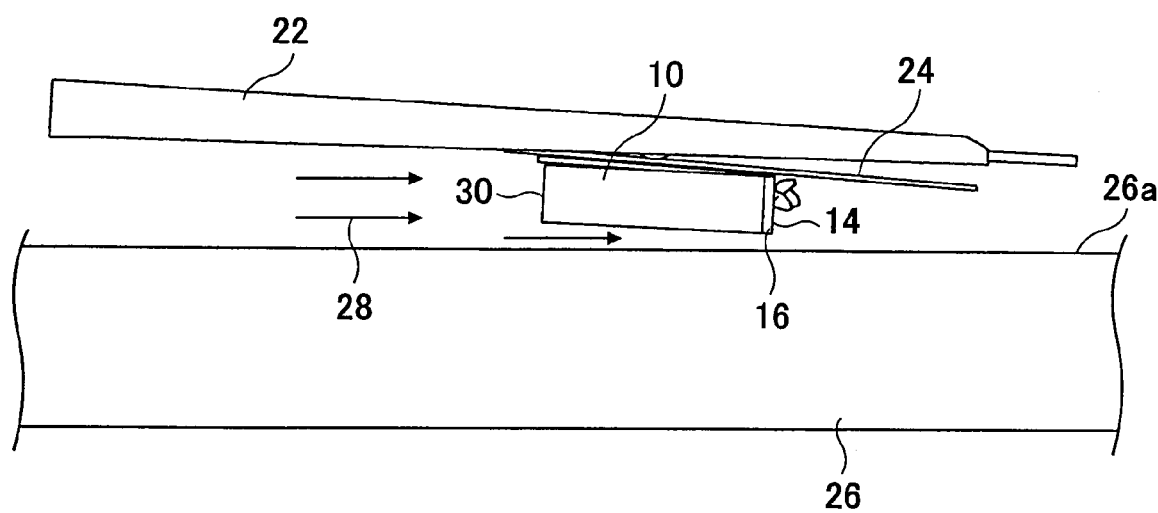
FIG. 3 is a side elevational view of a state where the head slider for magnetic disks is held to face a magnetic disk.

As shown in FIG. 3, the slider 10 is held at an end of a suspension 22 that is formed into an arm-like shape via a gimbal plate 24. The slider 10 is held at a slant so that the magnetic head 16 approaches a surface of a magnetic disk 26 that is rotated at a high speed. The magnetic head 16 performs magnetic recording on a magnetic layer of the magnetic disk 26 in a recording mode. In a reproducing mode, the magnetic head 16 reads information that is magnetically recorded on the magnetic disk 26.

When the magnetic disk 26 is rotated, airflow 28 is generated on the surface of the magnetic disk 26 in the direction indicated by arrows in FIG. 3. As a result, a lifting force is exerted on the disk-facing surface 12 by air pressure created while the airflow 28 passes along the disk-facing surface 12. The lifting force is exerted on the disk-facing surface 12 in the separating direction from the magnetic disk 26. In the slider 10, negative pressure is exerted on concave portions formed on the disk-facing surface 12, and positive pressure is exerted on protrusions formed on the disk-facing surface 12. Hence, the slider 12 is lifted to a position separated from the surface of the magnetic disk 26 by a minute distance by balance between the positive pressure and the negative pressure that are created by the shape of the disk-facing surface 12.

A lubricant layer 26a is formed on the surface of the magnetic disk 26 by applying a lubricant thereon. The lubricant layer 26a prevents the disk surface from being damaged by reducing friction caused when the slider 10 contacts the disk surface.

When the slider 10 contacts the surface of the magnetic disk 26, there is a case where minute dust particles come off the lubricant layer 26a. The dust that comes off the lubricant layer 26a is blown off by the airflow 28 that is generated by rotation of the magnetic disk 26.

Referring to FIGS. 1 and 2A through 2C again, a description will be given of the shape of the disk-facing surface 12.

As shown in FIGS. 1 and 2A through 2C, a front rail 32, a flow path 34, and rear rails 36 through 38 are formed on the disk-facing surface 12. The front rail 32 extends in the width direction of the slider 10 in the vicinity of an inflow-side end 30 from which the airflow 28 flows in. The airflow 28 passes through the flow path 34. The rear rails 36 through 38 are arranged on the downstream side of the flow path 34. The front rail 32 is formed into a U-shape when seen from the bottom surface, and includes extending portions 32a and 32b.

In addition, the front rail 32 is provided with a pair of front pads 40 and 42 and a pair of stick prevention pads 44 and 46 near the left and right sides of the front rail 32, respectively. The rear rails 36 through 38 are provided with rear pads 48 through 50, respectively. The airflow 28 flows into the flow path 34 by passing between the front pads 40 and 42. Since the flow path 34 is separated from the magnetic disk 26, a negative pressure attracting the slider 10 to the magnetic disk 26 is exerted thereon.

On the other hand, the front pads 40 and 42 and the rear pads 48 through 50 are more protruding than the flow path 34 so as to approach the magnetic disk 26. Hence, positive pressure separating the slider 10 from the magnetic disk 26 is exerted on the front pads 40 and 42 and the rear pads 48 through 50.

The flow path 34 is a flat surface formed approximately in the center of the disk-facing surface 12. An airflow guide part 52 extending in a V-like shape is formed in the flow path 34. The airflow guide part 52 includes a left guide groove 52a and a right guide groove 52b that are formed continuously. The left guide groove 52a extends toward the left side of the disk-facing surface 12 from approximately the center thereof, and the right groove 52b extends toward the right side of the disk-facing surface 12 from approximately the center thereof, when the slider 10 is seen from the bottom surface with the inflow-side end 30 facing down. Hereinafter, it is assumed that the slider is placed as mentioned above when referring to "left" and "right".

The left guide groove 52a and the right guide groove 52b are formed symmetrically in relation to the center line O of the slider 10 shown as a one-dot chain line in FIG. 2B. Hence, variation in negative pressure is balanced on the left and right sides of the slider 10. Accordingly, lifting characteristics of the slider 10 are not greatly influenced by the left guide groove 52a and the right guide groove 52b.

Referring to FIG. 2B, the left guide groove 52a and the right guide groove 52b are formed to extend in respective symmetric directions each inclined at an angle θ (in this embodiment, θ=approximately 120 degrees) with respect to the center line O that extends in the flow direction of the airflow 28. Thus, the airflow 28 entering the flow path 34 by passing between the front pads 40 and 42 flows into the center portion of the airflow guide part 52 as indicated by arrows A in FIG. 2B. Then, the airflow 28 is discharged toward the left and right side surfaces of the slider 10 along the left guide groove 52a and the right guide groove 52b as indicated by arrows B in FIG. 2B.

Thus, dust (including dust that comes off the lubricant layer 26a) moved by the airflow 28 flow into the center portion of the airflow guide part 52 and is discharged to the left and right side surfaces of the slider 10. Accordingly, it is possible to prevent dust from adhering to the outflow-side end 14 and the magnetic head 16 of the slider 10. Further, it is also possible to prevent the outflow-side end 14 from sticking to the magnetic disk 26 via dust that comes off the lubricant layer 26.

It should be noted that the angle of inclination θ of the left guide groove 52a and the right guide groove 52b is set to an arbitrary angle in accordance with the depth of the grooves, the flow rate of the airflow 28, and the like. Thus, θ=120 degrees is an example.

Referring to FIG. 2C, the left guide groove 52a and the right guide groove 52b are formed such that an inflow-side wall 52d and an outflow-side wall 52e are perpendicular to a bottom surface 52c. In addition, the roughness of the bottom surface 52c is greater than that of the surface of the flow path 34. For example, assuming that the average surface roughness Ra1 of the flow path 34 is Ra1=10-15 nm, then the average surface roughness Ra2 of the bottom surface 52c is Ra2=approximately 30 nm. For this reason, while passing through the flow-path 34, the airflow 28 moving along the disk-facing surface 12 is attracted by and flows into the left guide groove 52a and the right guide groove 52b, each having a surface roughness greater than that of the flow path 34. Also, dust moved by the airflow 28 positively flows into the left guide groove 52a and the right guide groove 52b and is discharged from the left and right side surfaces, respectively, of the slider 10 in lateral directions.

A description will now be given of modifications of the present invention.

Modification 1

Figure 4:
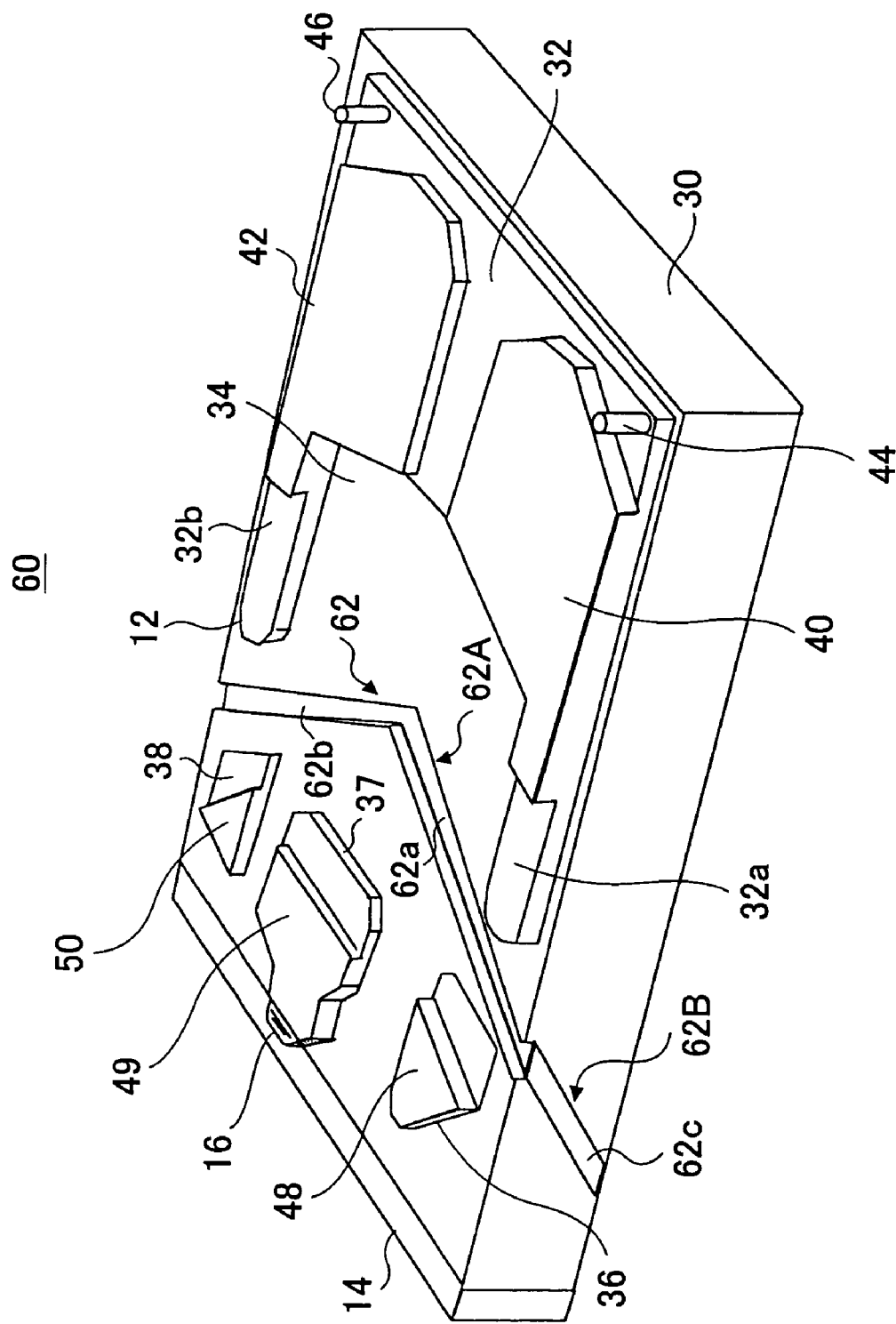
FIG. 4 is a perspective view showing the structure of a head slider for magnetic disks according to Modification 1 of the present invention.

FIG. 4 is a perspective view showing the structure of a slider according to Modification 1 of the present invention. FIG. 5A is a front elevational view, FIG. 5B is a bottom plan view, and FIG. 5C is a side elevational view showing the structure of the slider shown in FIG. 4. In FIGS. 4 and 5A through 5C, those parts that are the same as those corresponding parts in the above-mentioned embodiment are designated by the same reference numerals, and a description thereof will be omitted.

Referring to FIGS. 4 and 5A through 5C, an airflow guide part 62 of a slider 60 according to Modification 1 includes a first guide groove 62A and a pair of second guide grooves 62B. The first guide groove 62A is formed on the bottom surface of the slider 60. The second guide grooves 62B are formed on the left and right side surfaces of the slider 60. The first guide groove 62A includes a left bottom surface guide groove 62a and a right bottom surface guide groove 62b. The left bottom surface guide groove 62a extends toward the left side from approximately the center of the disk-facing surface 12. The right bottom surface guide groove 62b extends toward the right side from approximately the center of the disk-facing surface 12. The second guide grooves 62B includes a left side surface guide groove 62c provided on the left side surface of the slider 60 and a right side surface guide groove 62d provided on the right side surface of the slider 60. The above-mentioned grooves 62a through 62d of the airflow guide part 62 are formed continuously so that the grooves 62a through 62d communicate with each other.

The left bottom surface guide groove 62a and the right bottom surface guide groove 62b of the airflow guide part 62 are formed symmetrically. Also, the left side surface guide groove 62c and right side surface guide groove 62d of the airflow guide part 62 are formed symmetrically. Therefore, variation in the negative pressure is balanced on the left and right sides of the slider 60. Accordingly, the lifting characteristics of the slider 60 are not greatly influenced by the above-mentioned grooves 62a through 62d.

Referring to FIG. 5B, similarly to the left guide groove 52a and the right guide groove 52b, the left bottom surface guide groove 62a and the right bottom surface guide groove 62b are formed to extend in respective symmetric directions each inclined at an angle of θ with respect to the center line O that extends in the flow direction of the airflow 28. Referring to FIG. 5C, the left side surface guide groove 62c and the right side surface guide groove 62d are each formed to extend in the direction inclined at an angle of α (in this embodiment, α=approximately 120 degrees) with respect to the bottom surface of the slider 60.

It should be noted that each of the angles of inclination θ and α is set to an arbitrary angle in accordance with the depths of the grooves, the flow rate of the airflow 28, and the like. The value 120 degrees is an example.

Figure 6:
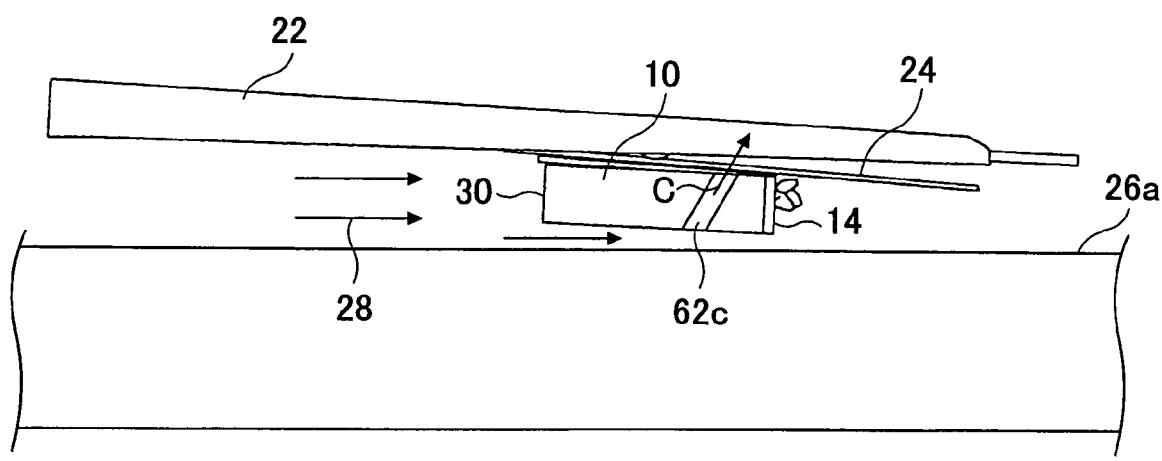
FIG. 6 is a side elevational view showing a state where the head slider for magnetic disks according to Modification 1 is held to face a magnetic disk.

Hence, the airflow 28 entering the flow path 34 by passing between the front pads 40 and 42 flows into the center portion of the airflow guide part 62 as indicated by the arrows A in FIG. 5B. Then, the airflow 28 is moved toward the left and right side surfaces along the left bottom surface guide groove 62a and the right bottom surface guide groove 62b, respectively. Further, as indicated by an arrow C in FIGS. 5C and 6, the airflow 28 is discharged upward by passing through the left side surface guide groove 62c and the right side surface guide groove 62d.

Accordingly, dust (including dust that comes off the lubricant layer 26a) moved by the airflow 28 flows into the center portion of the airflow guide part 62 and is moved toward the left and right sides of the slider 60. Then, the dust passes through the left side surface guide groove 62c and the right side surface guide groove 62d and is discharged upward. Hence, it is possible to prevent dust from adhering to the outflow-side end 14 and the magnetic head 16 of the slider 60. Further, it is also possible to prevent the outflow-side end 14 from sticking to the magnetic disk 26 via dust that comes off the lubricant layer 26a.

Modification 2

Figure 7:
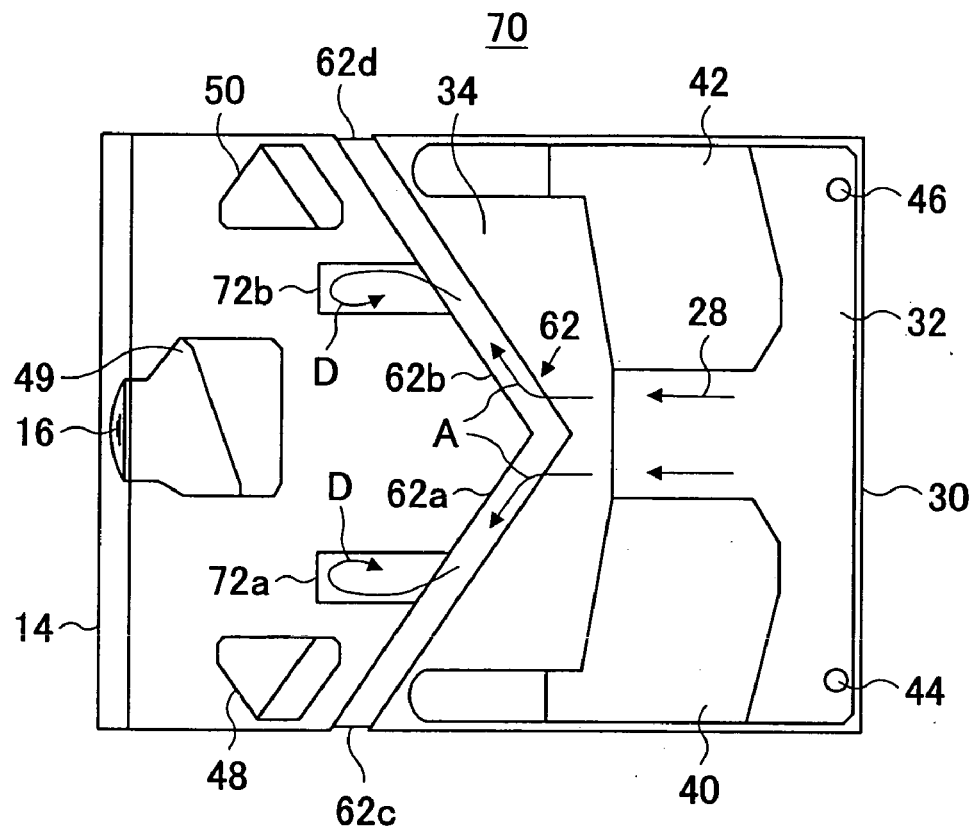
FIG. 7 is a bottom plan view of a head slider for magnetic disks according to Modification 2 of the present invention.

FIG. 7 is a bottom plan view of a slider according to Modification 2 of the present invention. In FIG. 7, those parts that are the same as those corresponding parts in the above-mentioned embodiment and Modification 1 are designated by the same reference numerals, and a description thereof will be omitted.

As shown in FIG. 7, in a slider 70 according to Modification 2, capturing grooves 72a and 72b extending in the flow direction (toward the downstream side) of the airflow 28 are formed in the inner walls of the left bottom surface guide groove 62a and the right bottom surface guide groove 62b, respectively. The capturing grooves 72a and 72b are formed to communicate with the left bottom surface guide groove 62a and the right bottom surface guide groove 62b in approximately the middle positions in the longitudinal directions of the grooves 62a and 62b, respectively. In addition, the capturing grooves 72a and 72b are formed deeper than the left bottom surface guide groove 62a and the right bottom surface guide groove 62b.

Hence, in the capturing grooves 72a and 72b, negative pressure greater than that in the left bottom surface guide groove 62a and the right bottom surface guide groove 62b is generated and acts to bring the airflow 28 therein.

The capturing grooves 72a and 72b are formed symmetrically. Thus, variation in the negative pressure is balanced on the left and right sides of the slider 70. Accordingly, lifting characteristics of the slider 70 are not greatly influenced by the capturing grooves 72a and 72b.

In the slider 70 according to Modification 2 configured as mentioned above, the airflow 28 entering the flow path 34 by passing between the front pads 40 and 42 flows into the center portion of the airflow guide part 62 as indicated by the arrows A in FIG. 7. Then, the airflow 28 is moved toward the left and right side surfaces of the slider 70 along the left bottom surface guide groove 62a and the right bottom surface guide groove 62b. Further, dust included in the airflow 28 flows into and is captured by the capturing grooves 72a and 72b as indicated by arrows D in FIG. 7.

Accordingly, the dust moved by the airflow 28 (including dust that comes off the lubricant layer 26a) flows into the center portion of the airflow guide part 62 and is captured by the capturing grooves 72a and 72b while the dust is being moved toward the left and right sides, respectively, of the slider 70. Thus, the dust adheres to inner walls of the capturing grooves 72a and 72b. Hence, according to Modification 2, it is possible to prevent dust from adhering to the outflow-side end 14 and the magnetic head 16 by capturing dust with the capturing grooves 72a and 72b. Further, it is also possible to prevent the outflow-side end 14 from sticking to the magnetic disk 26 via dust that comes off the lubricant layer 26a.

Modification 3

Figure 8:
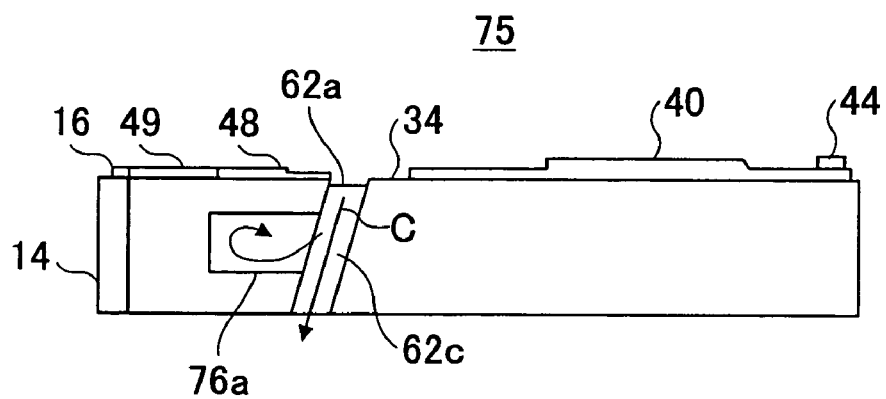
FIG. 8 is a side elevational view of a head slider for magnetic disks according to Modification 3 of the present invention.

FIG. 8 is a side elevational view of a slider according to Modification 3 of the present invention.

Referring to FIG. 8, in a slider 75 according to Modification 3, a capturing groove 76a communicating with the left side surface guide groove 62c is formed. The capturing groove 76a is formed to communicate with the left side surface guide groove 62c in approximately the middle position in the longitudinal direction of the left side surface guide groove 62c. In addition, similarly, a capturing groove 76b communicating with the right side surface guide groove 62d is formed in the slider 75, though illustration thereof is omitted. The capturing groove 76b is formed to communicate with the right side surface guide groove 62d in approximately the middle position of the longitudinal direction of the right side surface guide groove 62d. The capturing grooves 76a and 76b are formed deeper than the left side surface guide grooves 62c and the right side surface guide groove 62d.

Hence, in the capturing grooves 76a and 76b, negative pressure greater than that in the left side surface guide groove 62c and the right side surface guide groove 62d is generated.

In the slider 75 according to Modification 3 configured as mentioned above, the airflow 28 entering the flow path 34 flows into the center portion of the airflow guide part 62. Then, the airflow 28 is moved toward the left and right side surfaces of the slider 75 along the left bottom surface guide groove 62a and the right bottom surface guide groove 62b. Further, the dust included in the airflow 28 flows into the capturing grooves 76a and 76b while the airflow 28 is being discharged upward by passing through the left side surface guide groove 62c and the right side surface guide groove 62d.

Accordingly, the dust moved by the airflow 28 (including dust that comes off the lubricant layer 26a) flows into the capturing grooves 76a and 76b while being moved along the left side surface guide groove 62c and the right side surface guide groove 62d, respectively. Then, dust adheres to and is captured by inner walls of the capturing grooves 76a and 76b.

Modification 4

Figure 9:
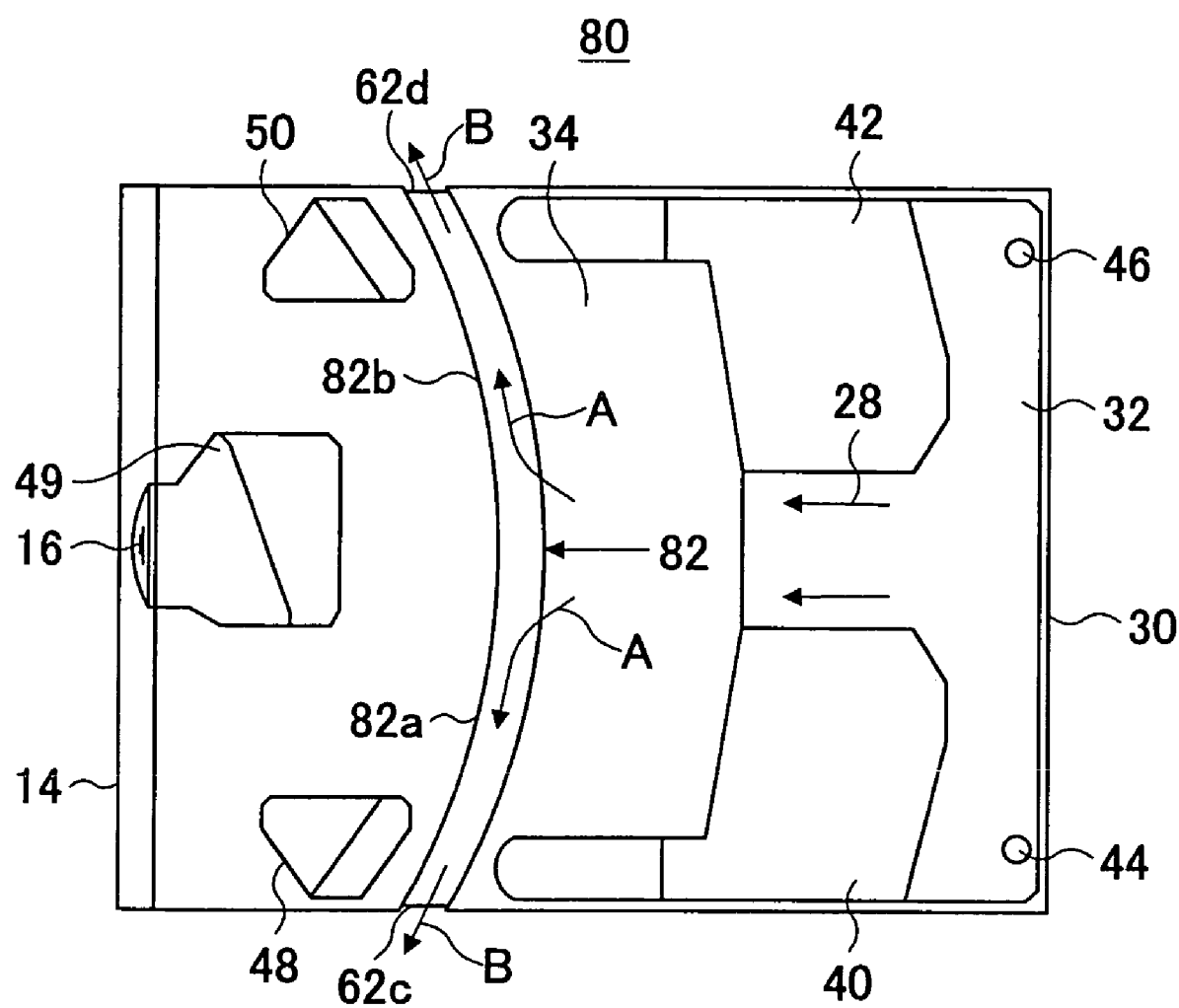
FIG. 9 is a bottom plan view of a head slider for magnetic disks according to Modification 4 of the present invention.

FIG. 9 is a bottom plan view of a slider according to Modification 4 of the present invention.

As shown in FIG. 9, in a slider 80 according to Modification 4, an airflow guide part 82 that is curved in an arc-like shape is formed in the flow path 34 on the bottom surface. The airflow guide part 82 includes a left bottom surface guide groove 82a curving toward the left side from the center of the airflow guide part 82 and a right bottom surface side groove 82b curving toward the right side from the above-mentioned center. Also, in the slider 80, the left side surface guide groove 62c and the right side surface guide groove 62d are formed as in the above-mentioned sliders 60, 70, and 75.

The airflow guide part 82 may be formed into the above-mentioned V-like shape or other shapes (for example, a parabola-like shape).

Modification 5

Figure 10A:
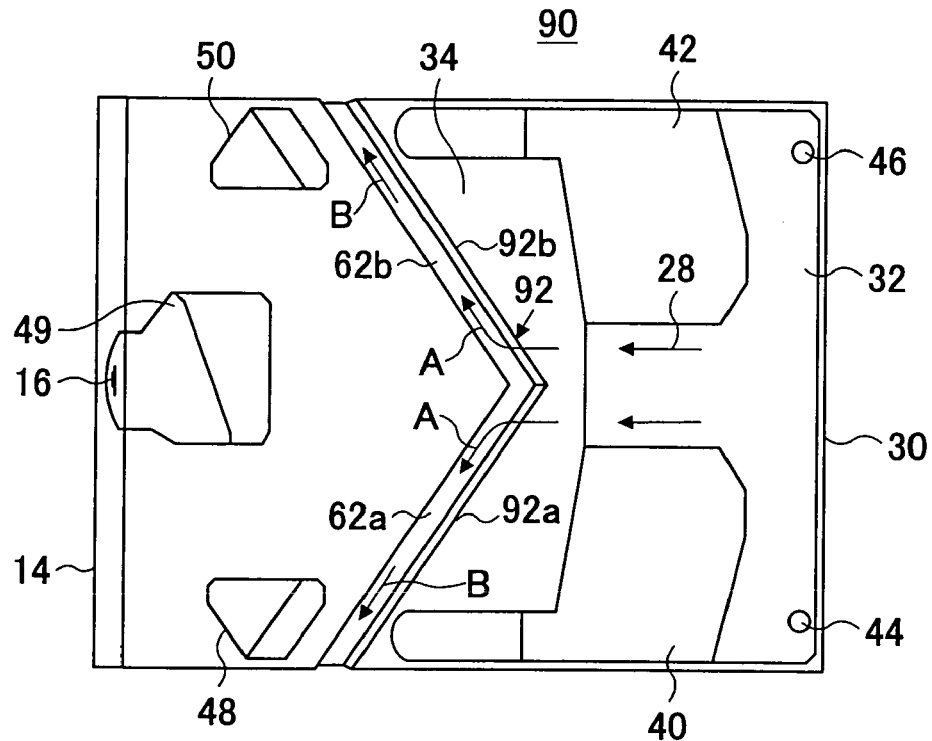
FIG. 10A is a bottom plan view and FIG. 10B is a side elevational view showing the structure of a head slider for magnetic disks according to Modification 5 of the present invention.
Figure 10B:
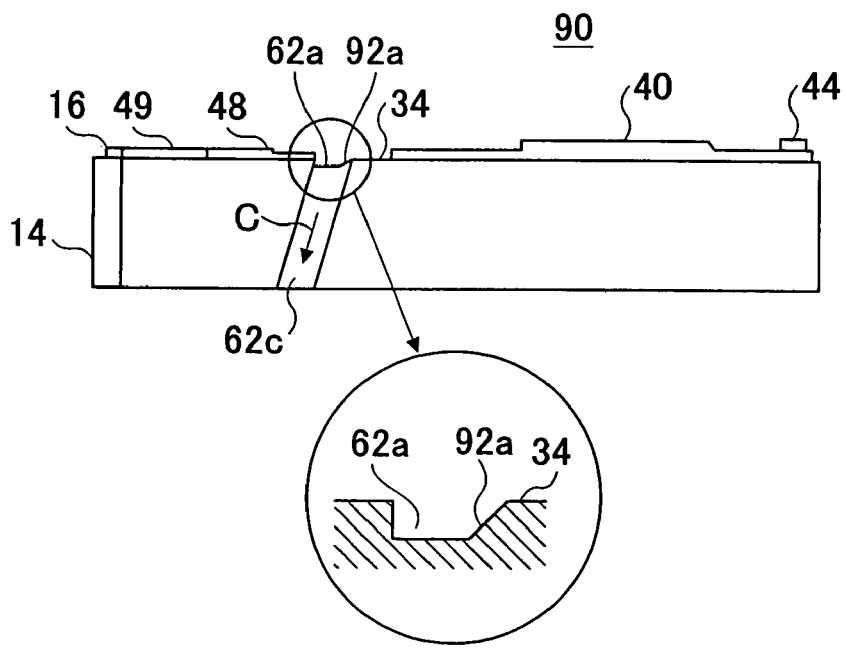

FIG. 10A is a bottom plan view and FIG. 10B is a side elevational view showing the structure of a slider according to Modification 5 of the present invention.

As shown in FIGS. 10A and 10B, in a slider 90 according to Modification 5, the cross-section of an airflow guide part 92 is formed into a trapezoid-like shape. The inflow-side inner walls of the left and right bottom surface guide grooves 62a and 62b are inclined surfaces 92a and 92b, respectively. In this manner, since the inflow-side inner walls of the left and right bottom surface guide grooves 62a and 62b are the inclined surfaces 92a and 92b, respectively, the airflow 28 smoothly flows into the center portion of the airflow guide part 92 along the inclined surfaces 92a and 92b, as indicated by arrows A in FIG. 10A. Then, the airflow 28 is discharged toward the left and right side surfaces of the slider 90 along the left bottom surface guide groove 62a and the right bottom surface guide groove 62b, respectively, as indicated by arrows B in FIG. 10A.

Accordingly, dust moved by the airflow 28 (including dust that comes off the lubricant layer 26a) flows into the center portion of the airflow guide part 92 and is discharged to the left and right sides of the slider 90.

Modification 6

Figure 11A:
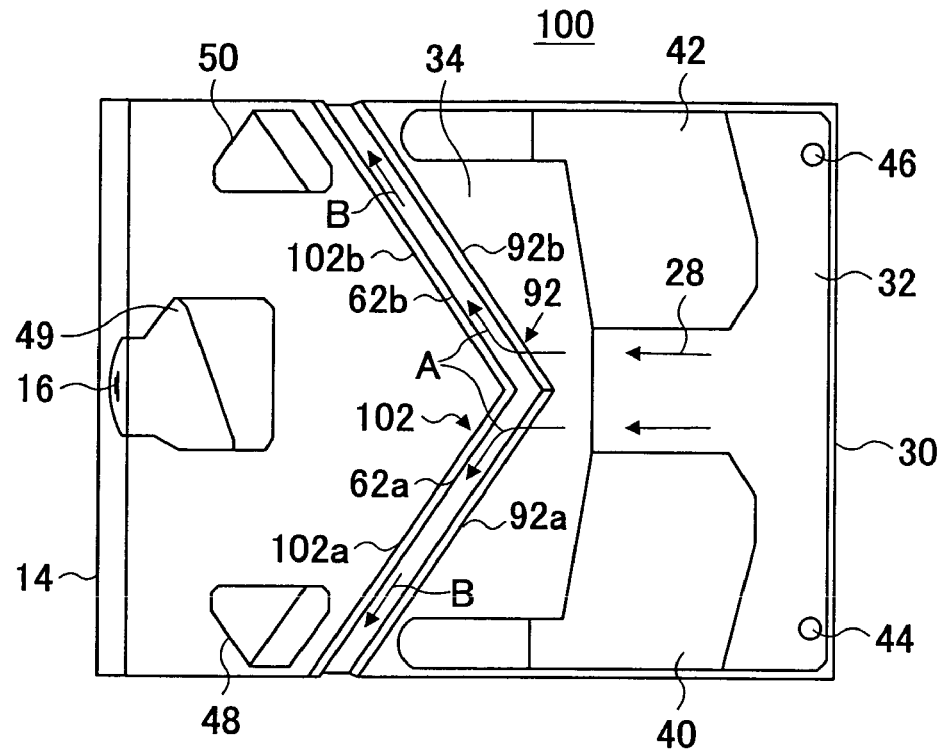
FIG. 11A is a bottom plan view and FIG. 11B is a side elevational view showing the structure of a head slider for magnetic disks according to Modification 6 of the present invention.
Figure 11B:
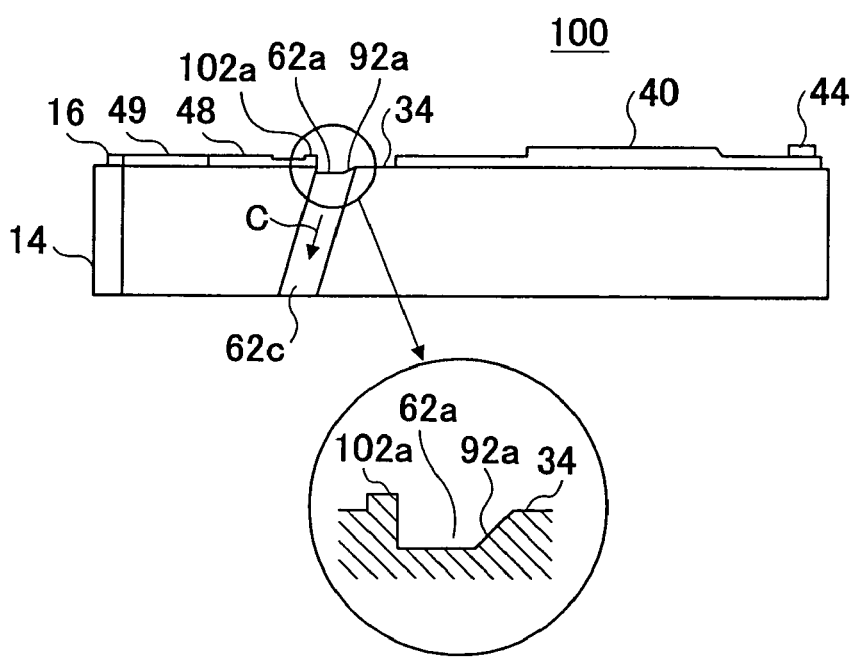

FIG. 11A is a bottom plan view and FIG. 11B is a side elevational view showing the structure of a slider according to Modification 6 of the present invention.

As shown in FIGS. 11A and 11B, a slider 100 according to Modification 6 includes the above-mentioned airflow guide part 92 and an airflow guide part 102. The airflow guide part 102 is formed to extend along the outflow-side inner walls of the left bottom surface guide groove 62a and the right bottom surface guide groove 62b and protrude higher than the flow path 34.

The airflow guide part 102 includes a left bottom surface guide protrusion 102a and a right bottom surface guide protrusion 102b. The left bottom surface guide protrusion 102a and the right bottom surface guide protrusion 102b extend parallel to the outflow-side inner walls of the left bottom surface guide groove 62a and the right bottom surface guide groove 62b, respectively.

In this manner, the left bottom surface guide protrusion 102a and the right bottom surface guide protrusion 102b are protruding from the outflow-sides of the left and right bottom surface guide grooves 62a and 62b, respectively. Accordingly, the airflow 28 smoothly flows into the center portion of the airflow guide part 92 along the inclined surfaces 92a and 92b as indicated by arrows A in FIG. 11A. Then, the flow direction of the airflow 28 is guided by the left bottom surface guide protrusion 102a and the right bottom surface guide protrusions 102b to the flow direction along the left bottom surface guide groove 62a and the right bottom surface guide grooves 62b, respectively. Thus, the airflow 28 is discharged toward the left and right sides of the slider 100.

Accordingly, the dust moved by the airflow 28 (including dust that comes off the lubricant layer 26a) flows into the center portion of the airflow guide part 92 and is discharged to the left and right side surfaces of the slider 100 by the left bottom surface guide protrusion 102a and the right bottom surface guide protrusion 102b.

The head slider for magnetic disks according to the present invention may be applied to any type of hard disk apparatus as well as a CSS (Contact Start Stop) type hard disk apparatus and a load/unload type hard disk apparatus.

According to one aspect of the present invention, dust entering the space between the disk-facing surface 12 and the magnetic disk 26 is discharged toward the sides of the slider 10 (60, 70, 75, 80, 90, 100) by the airflow guided toward the sides of the disk-facing surface 12 by the airflow guide part 52 (62, 82, 92). Hence, it is possible to prevent dust from adhering to the outflow-side end 14 of the slider 10 (60, 70, 75, 80, 90, 100). Accordingly, it is also possible to prevent the outflow-side end 14 of the slider 10 (60, 70, 75, 80, 90, 100) from sticking to the magnetic disk 26 via dust that comes off the lubricant layer 26a.

According to another aspect of the present invention, the airflow guide part 52 (62, 92) may be formed to extend in directions each inclined at an angle (θ) with respect to the flow direction of the airflow 28. Accordingly, it is possible to positively discharge dust entering the space between the disk-facing surface 12 and the magnetic disk 26 toward the sides of the slider 10 (60, 70, 75, 90, 100). Thus, it is possible to prevent dust from adhering to the outflow-side end 14.

In addition, according to another aspect of the present invention, it is possible to prevent dust from adhering to the outflow-side end 14 of the slider 70 (75) by capturing dust included in the airflow 28 by the capturing parts 72a and 72b (76a and 76b) of the airflow guide part.

Additionally, according to another aspect of the present invention, the airflow guide part 62 (92) may include: the first guide part 62A formed to extend from the vicinity of the center of the disk-facing surface 12 to both sides of the disk-facing surface 12; and the second guide parts 62B formed on opposing side surfaces of the slider 60 (70, 75, 80, 90, 100) and continuing with the first guide part 62A. Accordingly, it is possible to prevent dust from adhering to the outflow-side end 14 of the slider 60 (70, 75, 80, 90, 100) by discharging dust that enters the space between the disk-facing surface 12 and the magnetic disk 26 toward the sides of the slider 60 (70, 75, 80, 90, 100) and further discharging dust toward the outflow side from the side surfaces of the slider 60 (70, 75, 80, 90, 100).

Further, according to another aspect of the present invention, the first and second guide parts 62A and 62B may be formed to extend in respective directions each inclined at an angle (θ, α) with respect to the flow direction of the airflow 28. Accordingly, it is possible to positively discharge dust entering the space between the disk-facing surface 12 and the magnetic disk toward the sides of the slider 60 (70, 75, 80, 90, 100) and to further discharge the dust toward the outflow side from the side surfaces of the slider 60 (70, 75, 80, 90, 100).

In addition, according to another aspect of the present invention, it is possible to prevent dust from adhering to the outflow-side end 14 by capturing dust with the capturing parts 72a and 72b (76a and 76b) of one of the first and second guide parts 62A and 62B.

Accordingly, it is possible to prevent dust from adhering to the outflow-side end 14 of the slider 70 (75) by capturing dust that enters the space between the disk-facing surface 12 and the magnetic disk 26 with the capturing parts 72*a* and 72*b* (76*a* and 76*b*) of one of the first and second guide parts 62A and 62B.

Additionally, according to another aspect of the present invention, it is possible to positively discharge dust entering the space between the disk-facing surface 12 and the magnetic disk 26 toward the sides of the slider 60 (70, 75, 80, 90, 100) and further discharge the dust toward the outflow side from the sides of the slider by the first and second guide grooves 62A and 62B. Hence, it is possible to prevent dust from adhering to the outflow-side end 14.

Further, according to another aspect of the present invention, it is possible to prevent dust entering the space between the disk-facing surface 12, facing the surface of the magnetic disk 26, and the magnetic disk 26 from adhering to the outflow-side end 14 of the slider by capturing the dust with the capturing grooves 72*a* and 72*b* (76*a* and 76*b*) of one of the first and second guide grooves 62A and 62B.

In addition, according to another aspect of the present invention, since the inflow-side wall 92*a* of the first guide groove 62A is the inclined surface 92*a*, the airflow 28 flowing along the disk-facing surface 12 can easily flow into the first guide groove 62A. Hence, it is possible to positively discharge dust that is moved by the airflow 28 toward the sides of the slider 90 (100) along the first guide groove 62A. Thus, it is possible to prevent dust from adhering to the outflow-side end 14.

The present invention is not limited to the specifically disclosed embodiments, and variations and modifications may be made without departing from the scope of the present invention.

The present application is based on Japanese priority application No. 2002-331039 filed on Nov. 14, 2002, the entire contents of which are hereby incorporated by reference.

What is claimed is:

1. A head slider for a magnetic disk lifted above the magnetic disk by airflow generated by rotation of the magnetic disk, said head slider comprising:
a disk-facing surface having an air bearing surface raised from said disk-facing surface and a portion recessed within said disk-facing surface and located behind said air bearing surface when viewed in a direction of the airflow,
an airflow guide part formed in a flow path through which the airflow passes, the airflow guide part located in said portion recessed within said disk-facing surface and guiding the airflow along the disk-facing surface of said head slider toward sides of the disk-facing surface,
wherein the airflow guide part includes a first guide groove formed between both sides of the disk-facing surface, and
wherein roughness of a bottom surface of the airflow guide part is greater than roughness of a surface of the flow path.

2. The head slider as claimed in claim 1, wherein the airflow guide part is formed to extend in directions each inclined at an angle with respect to a flow direction of the airflow.

3. The head slider as claimed in claim 1, wherein the airflow guide part includes a capturing part that captures dust included in the airflow.

4. The head slider as claimed in claim 1, wherein the airflow guide part comprises:
a first guide part formed to extend from the vicinity of the center of the disk-facing surface to both sides of the disk-facing surface; and
a pair of second guide parts formed on opposing side faces of said head slider and continuing with said first guide part.

5. The head slider as claimed in claim 4, wherein the first and second guide parts are formed to extend in respective directions each inclined at an angle with respect to a flow direction of the airflow.

6. The head slider as claimed in claim 4, wherein one of the first and second guide parts includes a capturing part that captures dust included in the airflow.

7. The head slider as claimed in claim 1, wherein:
said first guide groove is formed to extend from the vicinity of the center of the disk-facing surface toward both sides of the disk-facing surface; and
a pair of second guide grooves are formed on opposing side faces of said head slider and communicating with said first guide groove.

8. The head slider as claimed in claim 7, wherein one of the first and second guide grooves includes a capturing groove that captures dust included in the airflow, and the capturing groove is formed deeper than the first and second guide grooves.

9. The head slider as claimed in claim 7, wherein, in the first guide groove, an inflow-side wall along which the airflow flowing along the disk-facing surface enters the first guide groove is an inclined surface, and an outflow-side wall along which the airflow flowing along the disk-facing surface is discharged is a vertical surface.

10. The head slider as claimed in claim 1, wherein the air bearing surface includes a pair of front pads, located in front of and adjacent to said portion recessed within said disk-facing surface when viewed in a direction of the airflow, and further wherein the airflow is guided between said front pads toward said airflow guide part.

11. A head slider for a magnetic disk lifted above the magnetic disk by airflow generated by rotation of the magnetic disk, said head slider comprising:
a disk-facing surface having a front rail raised from said disk-facing surface and a recessed portion that is recessed within said disk-facing surface and located behind said front rail when viewed in a direction of the airflow,
an airflow guide part formed in a flow path through which the airflow passes, the airflow guide part located in said recessed portion and guiding the airflow along the disk-facing surface of said head slider toward sides of the disk-facing surface,
wherein the airflow guide part includes a first guide groove formed between both sides of the disk-facing surface, and
wherein roughness of a bottom surface of the airflow guide part is greater than roughness of a surface of the flow path.

12. The head slider as claimed in claim 11, wherein the airflow guide part is formed to extend in directions each inclined at an angle with respect to a flow direction of the airflow.

13. The head slider as claimed in claim 11, wherein the airflow guide part includes a capturing part that captures dust included in the airflow.

14. The head slider as claimed in claim 11, wherein the airflow guide part comprises:

a first guide part formed to extend from the vicinity of the center of the disk-facing surface to both sides of the disk-facing surface; and a pair of second guide parts formed on opposing side faces of said head slider and continuing with said first guide part.

15. The head slider as claimed in claim 14, wherein the first and second guide parts are formed to extend in respective directions each inclined at an angle with respect to a flow direction of the airflow.

16. The head slider as claimed in claim 14, wherein one of the first and second guide parts includes a capturing part that captures dust included in the airflow.

17. The head slider as claimed in claim 11, wherein:

said first guide groove is formed to extend from the vicinity of the center of the disk-facing surface toward both sides of the disk-facing surface; and a pair of second guide grooves are formed on opposing side faces of said head slider and communicating with said first guide groove.

18. The head slider as claimed in claim 17, wherein one of the first and second guide grooves includes a capturing groove that captures dust included in the airflow, and the capturing groove is formed deeper than the first and second guide grooves.

19. The head slider as claimed in claim 17, wherein, in the first guide groove, an inflow-side wall along which the airflow flowing along the disk-facing surface enters the first guide groove is an inclined surface, and an outflow-side wall along which the airflow flowing along the disk-facing surface is discharged is a vertical surface.

20. The head slider as claimed in claim 11, further comprising:

a pair of front pads raised from said front rail, located in front of and adjacent to said recessed portion when viewed in a direction of the airflow, and further wherein the airflow is guided between said pair of front pads toward said airflow guide part.

21. The head slider as claimed in claim 1, wherein surfaces on both of said sides of the disk-facing surface are parallel to the airflow.

22. The head slider as claimed in claim 11, wherein surfaces on both of said sides of the disk-facing surface are parallel to the airflow.

* * * * *